(12) United States Patent
Woo et al.

(10) Patent No.: US 9,575,583 B2
(45) Date of Patent: Feb. 21, 2017

(54) LIQUID CRYSTAL DISPLAY PANEL WITH EMBEDDED TOUCH PANEL AND METHOD FOR MANUFACTURING THE SAME

(75) Inventors: Yoon-Hwan Woo, Seoul (KR); Min-Ho Na, Paju-si (KR); Sun-Jung Lee, Yongin-si (KR); Sang-Soo Hwang, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 320 days.

(21) Appl. No.: 12/961,153

(22) Filed: Dec. 6, 2010

(65) Prior Publication Data

US 2011/0291963 A1    Dec. 1, 2011

(30) Foreign Application Priority Data

May 27, 2010    (KR) .................. 10-2010-0049874

(51) Int. Cl.
*G06F 3/044* (2006.01)
*G06F 3/041* (2006.01)
*G02F 1/1333* (2006.01)

(52) U.S. Cl.
CPC ............. *G06F 3/0412* (2013.01); *G06F 3/044* (2013.01); *G02F 1/13338* (2013.01); *G06F 2203/04112* (2013.01)

(58) Field of Classification Search
CPC .................................................. G02F 1/13338
USPC .......................................................... 349/12
See application file for complete search history.

(56) References Cited

U.S. PATENT DOCUMENTS

| | | | |
|---|---|---|---|
| 2006/0097991 A1* | 5/2006 | Hotelling et al. | 345/173 |
| 2006/0250373 A1* | 11/2006 | Sakurai et al. | 345/173 |
| 2007/0273670 A1* | 11/2007 | Nordahl | 345/173 |
| 2009/0002338 A1* | 1/2009 | Kinoshita et al. | 345/174 |
| 2009/0194344 A1* | 8/2009 | Harley et al. | 178/18.06 |
| 2009/0283342 A1* | 11/2009 | Schediwy et al. | 178/19.03 |
| 2009/0314551 A1* | 12/2009 | Nakajima | 178/18.05 |
| 2009/0315854 A1* | 12/2009 | Matsuo | 345/174 |
| 2009/0315858 A1* | 12/2009 | Sato et al. | 345/174 |
| 2009/0315859 A1* | 12/2009 | Chien et al. | 345/175 |
| 2009/0322703 A1* | 12/2009 | Tseng et al. | 345/174 |
| 2010/0085326 A1* | 4/2010 | Anno | 345/174 |
| 2010/0182273 A1* | 7/2010 | Noguchi | G02F 1/13338 345/174 |

(Continued)

FOREIGN PATENT DOCUMENTS

CN    101609384 A    12/2009
JP    2000-253288    9/2000

(Continued)

OTHER PUBLICATIONS

Office Action issued in corresponding Chinese Patent Application No. 201010599564.3, mailed Jun. 26, 2013, 22 pages.

(Continued)

*Primary Examiner* — Lauren Nguyen
*Assistant Examiner* — Anthony G Quash
(74) *Attorney, Agent, or Firm* — Brinks Gilson & Lione (57) ABSTRACT

A touch display device includes a display panel, a conductive layer disposed on the display panel, a touch electrode disposed adjacent to the conductive layer and on the display panel, a routing line coupled to the touch electrode, and a polarizer disposed on the touch electrode and the conductive layer, where the conductive layer and the touch electrode are formed of the same material.

14 Claims, 7 Drawing Sheets

(56) References Cited

U.S. PATENT DOCUMENTS

| | | | |
|---|---|---|---|
| 2011/0069036 A1* | 3/2011 | Anno | 345/174 |
| 2011/0122079 A1* | 5/2011 | Shih et al. | 345/173 |
| 2011/0141040 A1* | 6/2011 | Kang et al. | 345/173 |

FOREIGN PATENT DOCUMENTS

| | | | | |
|---|---|---|---|---|
| JP | 2002-116880 | | 4/2002 | |
| JP | 2004-38927 | * | 2/2004 | G06F 3/033 |
| KR | 1020000066059 A | | 11/2000 | |
| KR | 100639732 B1 | | 10/2006 | |

OTHER PUBLICATIONS

Office Action issued in corresponding Korean Patent Application No. 10-2010-0049874, mailed Feb. 25, 2013.

* cited by examiner

LIQUID CRYSTAL DISPLAY PANEL WITH EMBEDDED TOUCH PANEL AND METHOD FOR MANUFACTURING THE SAME

CROSS REFERENCE TO RELATED APPLICATION

This application claims the priority benefit of Korean Patent Application No. 10-2010-49874, filed on May 27, 2010, which is hereby incorporated by reference as if fully set forth herein.

BACKGROUND

Field of the Disclosure

The present disclosure relates to a touch panel, and more particularly, to a liquid crystal display device with an embedded touch panel, in which touch electrodes are formed on a substrate each with divided electrode pieces, and each of which has a touch sensing function by sensing a touch without a button for selecting a particular function, and a method for manufacturing the same.

Discussion of the Related Art

Recently, as the society enters into a fully information oriented society, an industry area relating to display devices for visually expressing electric information signals have rapidly developed. As a result, different flat display devices which are favorable for making the display devices thinner, lighter and to consuming less power have been developed, rapidly replacing existing cathode ray tubes.

As examples of the flat display devices, there are liquid crystal display ("LCD") device, plasma display panel ("PDP") device, field emission display ("FED") device, and electro luminescence display ("ELD") device, all of which essentially require flat display panels for producing pictures. The flat display panel is provided with one pair of transparent substrates bonded to face each other, with a unique light emission material or polarizing material layer disposed therebetween.

Of the flat display devices, the liquid crystal display device controls light transmissivity of liquid crystals by using an electric field for displaying a picture. To do this, the liquid crystal display device is provided with a display panel having liquid crystal cells, a backlight unit for directing light to the display panel, and a driving circuit for driving the liquid crystal cells.

The display panel includes a plurality of gate lines and a plurality of data lines formed to cross each other to define a plurality of unit pixel regions. Each of the pixel regions has a thin film transistor array substrate and a color filter array substrate facing each other, spacers positioned between the two substrates for maintaining a fixed cell gap, and liquid crystals filled in the cell gap.

The thin film transistor array substrate includes the gate lines and the data lines, a thin film transistor formed as a switching device at every crossed portion of the gate lines and the data lines, a pixel electrode and so on formed at every liquid crystal cell connected to the thin film transistor, and an alignment film coated on the above elements. The gate lines and the data lines have signals supplied thereto through relevant pads.

The thin film transistor supplies a pixel voltage signal from the data line to the pixel electrode in response to a scan signal from the gate line.

The color filter array substrate has a color filter formed at every liquid crystal cell, a black matrix for dividing the color filters and reflecting an external light, a common electrode and so on for supplying a reference voltage to the liquid crystal cells in common, and an alignment film coated on above elements.

Fabrication of the display panel is finished as the thin film transistor array substrate and the color filter array substrate formed individually are aligned and bonded to face each other, and the liquid crystals are injected therebetween.

Recently, demands have been on the rise for the addition of a touch panel to the liquid crystal display device, for perceiving a touched portion made by a hand or additional input means, and provide information in response. Currently, the touch panel is applied to the liquid crystal display device in a fashion in which the touch panel is attached to an outside surface of liquid crystal display device.

In the touch panel may be categorized as a resistive type, a micro capacitive type, an infrared type, and so on according to the type of touch sensing mechanisms used. Taking convenience of fabrication and sensing capability into account, recently the micro capacitance type is gaining attention in smaller sized models.

A related art liquid crystal display device will be described with reference to the attached drawings.

Figure 1:
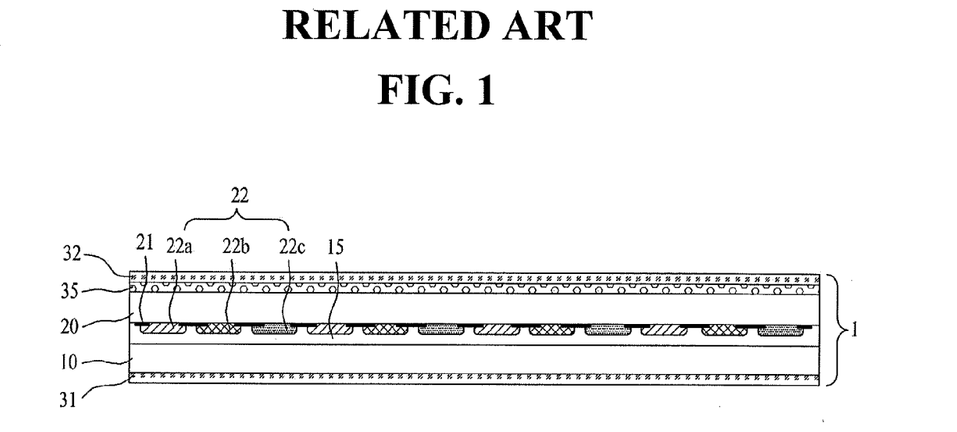
FIG. 1 illustrates a section of a related art liquid crystal display device.

FIG. 1 illustrates a section of a related art liquid crystal display device.

Referring to FIG. 1, the related art liquid crystal display device 1 is provided with a first substrate 10 and a second substrates 20 faced to each other, a thin film transistor array formed on the first substrate 10, a black matrix layer 21 and a color filter layer 22 formed on the second substrate 20, and a liquid crystal layer 15 filled between the first and second substrates 10 and 20.

The color filter layer 22 includes a red color filter layer 22a, a green color filter layer 22b, and a blue color filter layer 22c.

The first and second substrates 10 and 20 have a first polarizing plate 31 and a second polarizing plate 32 formed on backsides (outer surfaces) thereof, respectively.

If the liquid crystal display device has an IPS mode (In Plane Switching mode) configuration in which the liquid crystal display device is driven by a lateral electric field, a transparent conductive film 35 is formed on the outer surface of the second substrate 20 for shielding static electricity.

In this case, the transparent conductive film 35 is directly sputtered onto the outer surface of the second substrate 20, on which the second polarizing plate 32 is formed.

In this instance, the transparent conductive film 35 is grounded.

However, the related art liquid crystal display device has the following problems.

If the related art liquid crystal display device is produced as a large sized model of a TV set, buttons are separately provided on an outside case at a periphery of the panel for selection of volume or channel, or so on. However, the existence of the outside case which occupies a certain area of a periphery of the panel for providing such buttons impedes production of a narrow bezel or a borderless structure. That is, the area of the outside case, which is not used for actual display, increases.

In order to improve upon the above, an effort is suggested in which the buttons are not separately mounted to an outside case, but provided functionally in the panel.

Accordingly, there has been an effort for providing particular function keys in the panel as particular keys for user's selection while omitting the buttons.

SUMMARY

A touch display device includes a display panel, a conductive layer disposed on the display panel, a touch electrode disposed adjacent to the conductive layer and on the display panel, a routing line coupled to the touch electrode, and a polarizer disposed on the touch electrode, and the conductive layer. The conductive layer and the touch electrode are formed of the same material.

A method for manufacturing a touch display device includes depositing a transparent electrode on a substrate, patterning the transparent electrode to form a conductive layer, a touch electrode adjacent to the conductive layer and a routing line coupled to the touch electrode, and disposing a polarizer on the conductive layer, the touch electrode. The conductive layer is electrically separated from the touch electrode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF SPECIFIC EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

Figure 2:
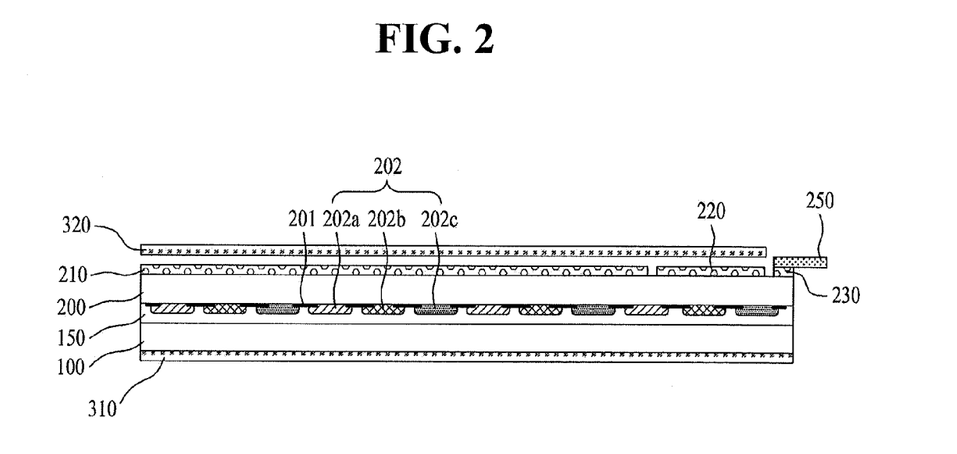
FIG. 2 illustrates a section of a liquid crystal display device with an embedded touch panel in accordance with a preferred embodiment of the present disclosure.
Figure 3:
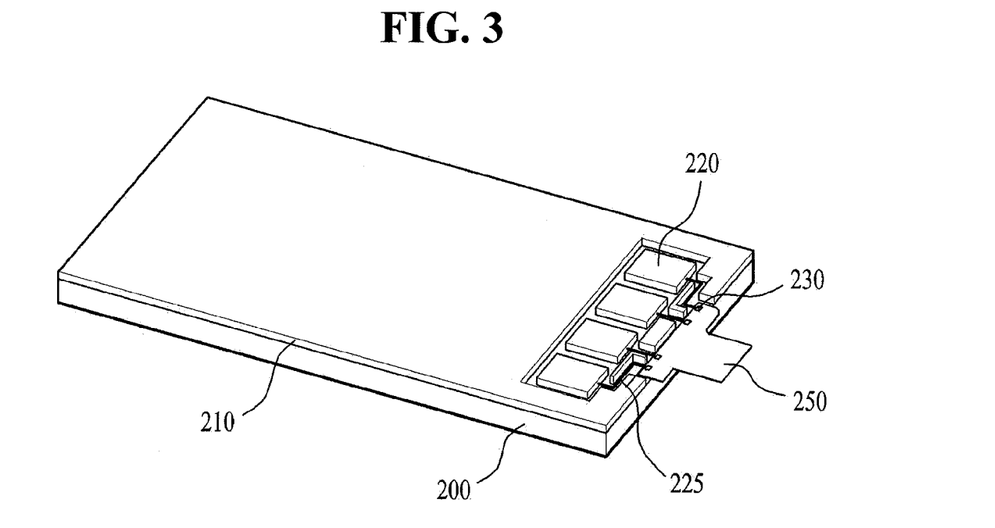
FIG. 3 illustrates an upper side perspective view of the liquid crystal display device with an embedded touch panel in FIG. 2 before a second polarizing plate is formed thereon.

FIG. 2 illustrates a section of a touch display device in accordance with a preferred embodiment of the present disclosure, and FIG. 3 illustrates an upper side perspective view of the touch display device in FIG. 2 before a second polarizing plate is formed thereon.

Referring to FIGS. 2 and 3, the touch display device includes a transparent conductive film formed on an outer surface of a second substrate 200. The transparent conductive film is patterned to form a transparent conductive film 210 at a major area of the transparent conductive film for grounding, except for the outer surface of the transparent film. Further, a plurality of touch electrodes 220 is formed at the outer surface by patterning the outer surface again to divide the outer surface further. In this instance, the transparent conductive film 210 is formed at the major portion of the transparent film except for the plurality of the touch electrode 220.

That is, the touch display device includes a first substrate 100 and a second substrate 200 faced to each other, a thin film transistor array (not shown) formed on the first substrate 100, a black matrix layer 201 and a color filter layer 202 formed on the second substrate 200, and a liquid crystal layer 150 filled between the first and second substrates 100 and 200.

In this instance, the color filter layer 202 includes first to third color filter layers 202a, 202b and 202c having colors different from one another, enabling a combination of colors that can become a white color light when a red color light, a green color light and a blue color light are combined. Further, in order to display a more natural color, the color filter layer 202 may additionally include a fourth or fifth color filter layer.

In the meantime, the transparent conductive film 210 and the plurality of touch electrodes 220 are patterns formed by one-time patterning of a transparent electrode material formed on the outer surface of the second substrate 200. In this instance, the transparent electrode material is deposited on the outer surface of the second substrate 200 by sputtering or the like, and is patterned to separate from one another by exposing and developing photoresist to form the transparent conductive film 210 and the plurality of touch electrodes 220. Together with formation of the touch electrodes 220, routing lines 225 respectively connected to the touch electrodes 220 are formed of the same material as the touch electrodes 220.

Alternatively, a transparent conductive film may be printed on the outer surface of the second substrate 200 to form the transparent conductive film 210 and the plurality of touch electrodes 220, which are separated from each other.

The transparent conductive film 210 is grounded to prevent static electricity from forming at the liquid crystal panel having the first and second substrates 100 and 200 and the liquid crystal layer 150. In this case, the transparent conductive film 210 may be connected to a PCB (not shown) to ground the transparent conductive film 210, or may be grounded to an inside of the case which encases the liquid crystal panel with a conductive tape or the like disposed therebetween.

Thus, the grounding of the transparent conductive film 210 is required for preventing external static electricity from entering into the panel to form of an unintended electric field. Particularly, it is typically required for a structure in which the pixel electrode and the common electrode are formed alternately on an inside of the first substrate 100 to form a lateral electric field, such as the IPS mode. However, in the touch display device of the present disclosure, the grounding is not limited to the IPS mode, but applicable to a structure which has a common electrode on an inside of the second substrate 200 to form a vertical electric field, such as a TN mode or VA mode.

Moreover, the plurality of touch electrodes 220 can be formed separably at the user's request. The touch electrodes 220 may have an area adequate to accept the user's touch when the user touches the screen. That is, it is preferable that the touch electrodes 220 shown in the attached drawings are provided in a large-sized TV set, such as ones having screen sizes greater than 20 inches, for the replacement of the functions provided by buttons, such as channel selection or a volume selection. Further, it is preferable that the touch electrodes 220 have an area greater than 0.1 $cm^2$.

In the meantime, the plurality of touch electrodes 220 are connected to an FPC substrate 250 for controlling a signal through the routing lines 225. The routing lines 225 are connected to the FPC substrate 250 with a pad electrode 230 disposed therebetween. The pad electrode 230 is formed of a transparent conductive material patterned from the same layer as the touch electrodes 220. Both the routing lines 225 and the pad electrode 230 are formed of the transparent conductive material.

Though not shown, the FPC substrate 250 is connected to a system of the liquid crystal panel which supplies a timing signal and a picture signal to the PCB, and receives a control signal therefrom. In the meantime, the transparent conductive film 210 is connected to the FPC substrate 250 through an additional routing line or a conductive tape for grounding.

In this instance, the plurality of touch electrodes 220 are positioned at a display region for the user to touch the touch electrode by allowing an input tool, such as a finger, to be adjacent to the touch electrode 220, while personally watching a screen.

In the meantime, a first polarizing plate 310 is attached to the outer surface of the first substrate 100, and a second polarizing plate 320 is attached to the transparent conductive film 210 and the plurality of touch electrodes 220.

In this case, the attachment of the first polarizing plate 310 or the second polarizing plate 320 is made by peeling off the protective film, aligning the adhesive with the outer surface of the first substrate 100 or the transparent conductive film 210 and the plurality of touch electrodes 220, and laminating the first polarizing plate 310 or the second polarizing plate 320. The above described attachment may be made while an adhesive is coated to one surface of the first polarizing plate 310 or the second polarizing plate 320 with a protective film attached thereto for protecting an upper side thereof.

In this instance, the adhesive infiltrates between the transparent conductive film 210 and the plurality of touch electrodes 220 from the second polarizing plate 320 to maintain flatness of a surface of the second polarizing plate 320.

Moreover, the user does not directly touch the plurality of touch electrodes 220, but a touch is sensed with the second polarizing plate 320 disposed between the input tool, such as a finger, and the touch electrode 220. For an example, if the user touches a portion of the second polarizing plate 320 on one of the plurality of touch electrodes 220, charge flows from the touch electrode 220 to which a voltage is being applied toward the input tool, causing a change of capacitance. The touch is sensed by sensing such a change, and according to presence of the touch and a number of the touches made, a function of the touch electrode 220 that is touched is performed. Such function may be, for an example, channel selection, volume selection, or slide gesture.

In this case, the touch electrode 220 is driven in the micro capacitive type as the second polarizing plate 320 is disposed therebetween, and can produce a clear picture without impairing a picture quality because the touch electrode 220 has no additional element in cross section and no additional air gap in comparison to a structure of the related art liquid crystal display device. Especially, the touch electrode has no air gap in comparison to a structure such as the resistive film type which includes two substrates, transparent conductive film on each of the substrates, spacers, and so on. Therefore, the touch electrode 2120 enables the production of clear picture without reflection.

In the meantime, even though the above-described touch electrode describes an example where a touch electrode is formed on an outer surface of the second substrate of the liquid crystal panel, the touch electrode may also be formed on the outer surface of a separately provided substrate.

Moreover, an inside configuration of the liquid crystal panel described above is applicable not only to the IPS mode, but also to the TN or VA mode. That is, regardless of the formation of the common electrode on an inside surface of the second substrate 200, the function keys supporting the user's selection functions can be formed in the panel by forming the transparent conductive film on a major portion of the area of the outer surface of the second substrate 200 excluding one side of the outer surface, and forming the plurality of touch electrodes on one side of the outer surface.

Figure 4A:
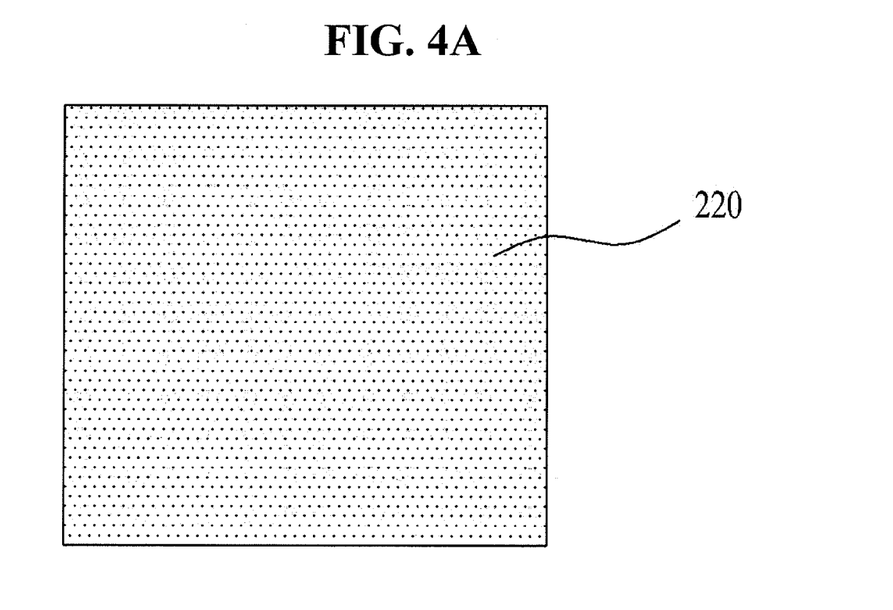
FIGS. 4A and 4B illustrate plan views showing variations of the touch electrode in FIG. 3, respectively.
Figure 4B:
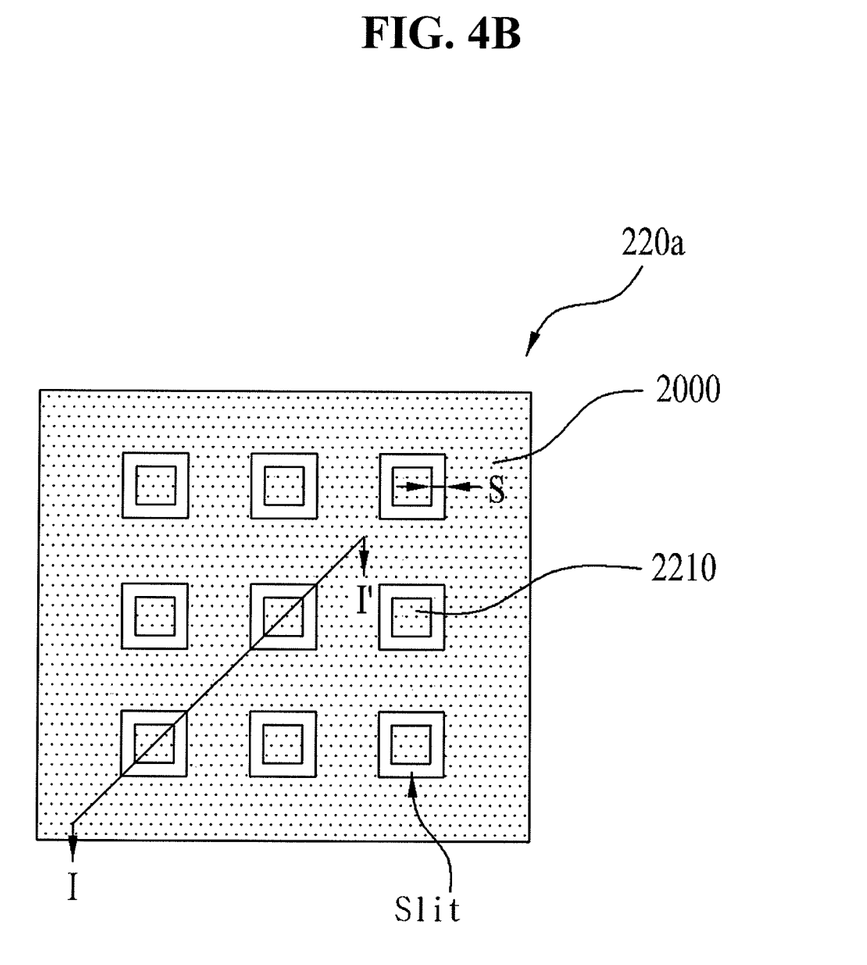

FIGS. 4A and 4B illustrate plan views showing variations of the touch electrode in FIG. 3, respectively.

In the meantime, referring to FIG. 4A, although the touch electrode 220 can be formed wholly without any inside patterns as shown in FIG. 4A, the touch electrode 220 can be formed as a touch electrode 220a including mesh patterns 2000 each with a hole and a dummy pattern 2210 formed in each of the holes as shown in FIG. 4B. In an embodiment, the mesh pattern may include one or more holes and may or may not include the dummy pattern in the hole.

The touch electrodes 220 and 220a have a difference in areas. If the area is large, the capacitance is also large and thus the change in capacitance before and after the touch is small. Therefore, a touch electrode having a large area has low touch sensitivity. Moreover, the touch electrode having a large area also has a large time constant (RC relay) due to great initial capacitance at the time of initial driving, thereby causing slow signal sensing. Furthermore, the touch electrode having a large area, due to the small change in capacitance before and after the touch, may cause malfunction, such as no response or delayed response.

Accordingly, a scheme has been suggested in which the touch electrode 200 is divided into small pieces if a whole touch electrode 220 as shown in FIG. 4A is provided. However, since more routing lines as many as the divided electrodes are required, an area occupied by the routing lines becomes greater. In this instance, a narrow bezel is not possible due to an increased non-display area, such as the routing lines.

Consequently, the touch display device of the present disclosure is directed to a method for reducing an electrode area by providing a hole in the touch electrode, such as the mesh pattern 2000, while applying a single signal to the touch electrode.

Figure 5:
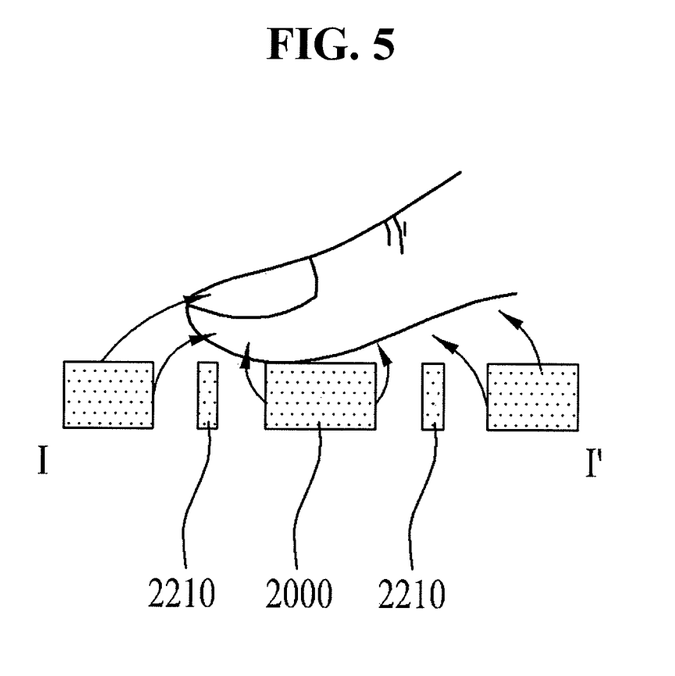
FIG. 5 illustrates a section showing capacitance occurred when the touch electrode in FIG. 4B is being touched, schematically.

FIG. 5 schematically illustrates a section showing capacitance occurring when the touch electrode in FIG. 4B is being touched.

Referring to FIGS. 4B and 5, by forming the touch electrode 200a in a net form having the mesh patterns 2000 with holes disposed between adjacent eyes of the net form to reduce an area of a touched portion, an initial capacitance can be reduced. Such configuration may provide the effect of as if one touch electrode is divided into small pieces of electrodes. In this case, the initial capacitance is $c=\epsilon A/d$. Since the area A is reduced in comparison to the case of FIG. 4A, the initial capacitance can be reduced.

Though the initial capacitance can be reduced by making a size of the hole greater and thereby reduce the area of the touch electrode 200a, there is a risk of making a hole portion visible if the hole becomes greater. In order to prevent this from occurring, a dummy pattern 2210 may be formed in the hole. The dummy pattern 2210 may be spaced apart from the mesh pattern by a gap S as shown in FIG. 4B. The dummy pattern 2210 may be a floating pattern to which no voltage is applied.

The dummy pattern 2210 is formed of a transparent electrode material, and can be formed to have a width of about 10~300 μm. To prevent the hole from becoming visible, it is preferable that the gap S is about 10~30 μm at a periphery of the mesh pattern 2000.

Referring to FIG. 5, the floating dummy pattern 2210 will cause no change in the capacitance before and after a touch with the input tool, such as the finger. Even in such embodiment, the change of the capacitance at the time of the touch is about the same as with a case of FIG. 4A, owing to a charge discharge effect from the input tool, such as the finger. Accordingly, in the embodiment of FIG. 5, since the time constant does not increase due to reduction of the initial capacitance, the touch can be sensed at a fast speed, improving sensitivity of the touch.

The mesh structure is suitable for a large structured touch electrode at which the user performs a selection function, such a large sized liquid crystal display device, for example, as a TV set or a large electronic display. Especially, the mesh structure can reduce the initial capacitance and improve the touch sensitivity without increasing a number of the routing lines.

In the meantime, the touch display device described in FIGS. 2 and 3 shows an example in which a plurality of the touch electrodes is formed at a side of an outer surface of the substrate. As shown, the touch electrodes may be formed at a side or a lower side.

Figure 6:
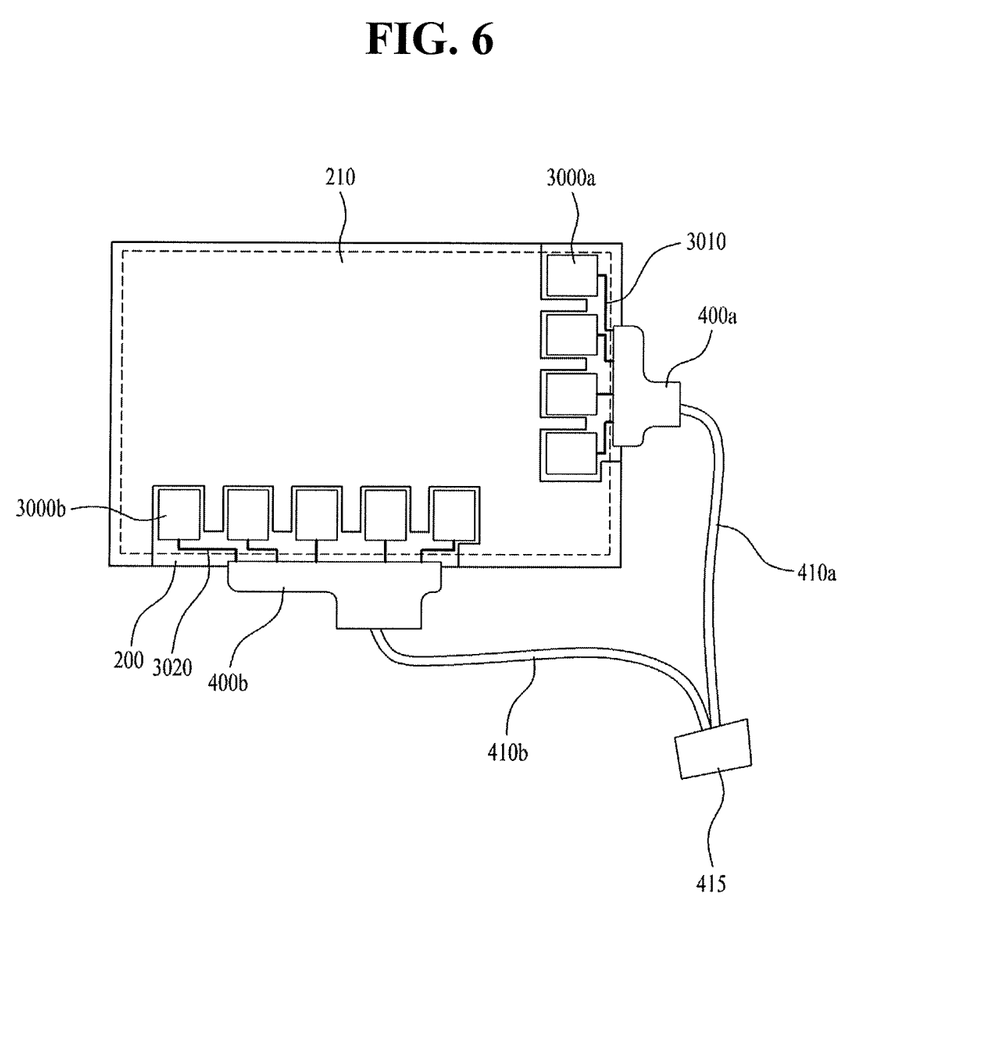
FIG. 6 illustrates a section of a liquid crystal display device with an embedded touch panel in accordance with another preferred embodiment of the present disclosure.

However, a position of the touch electrodes is not limited to the above. If it is intended to diversify a selection menu, the touch electrodes 3000a and 3000b may be provided both at the side and the lower side.

Figure 7A:
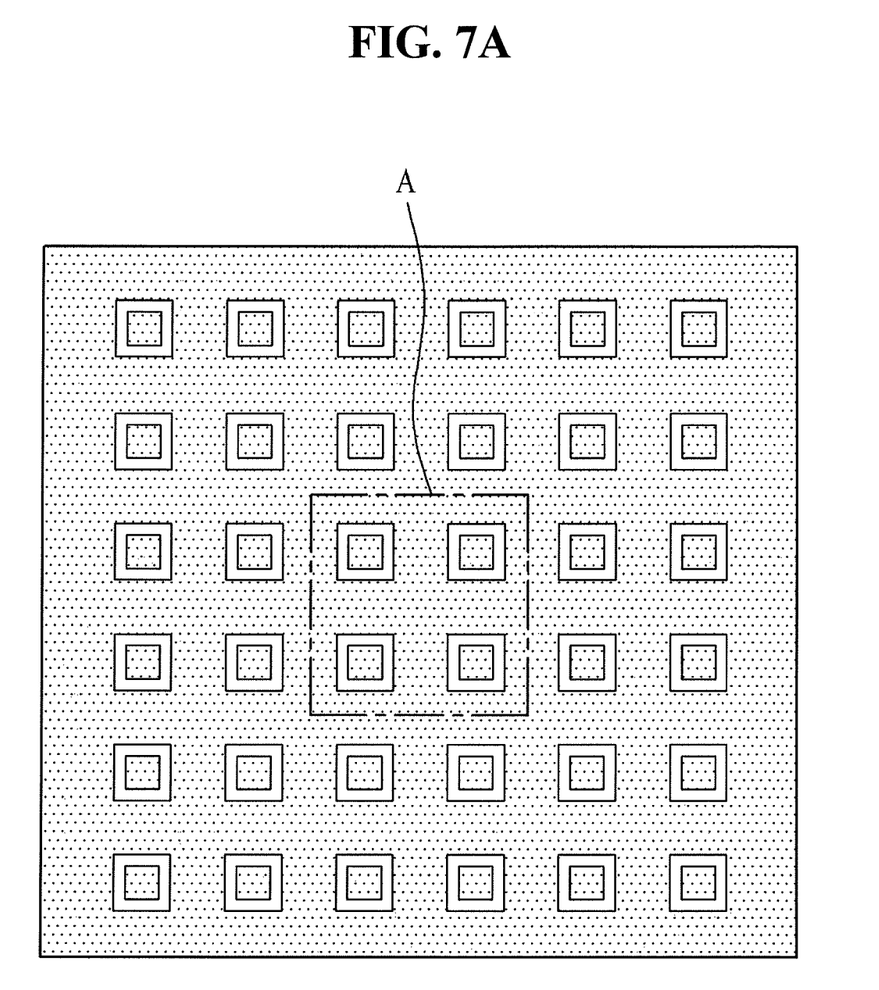
FIGS. 7A and 7B illustrate a touch electrode in FIG. 6 and an enlarged view of "A" part in FIG. 7A, respectively.
Figure 7B:
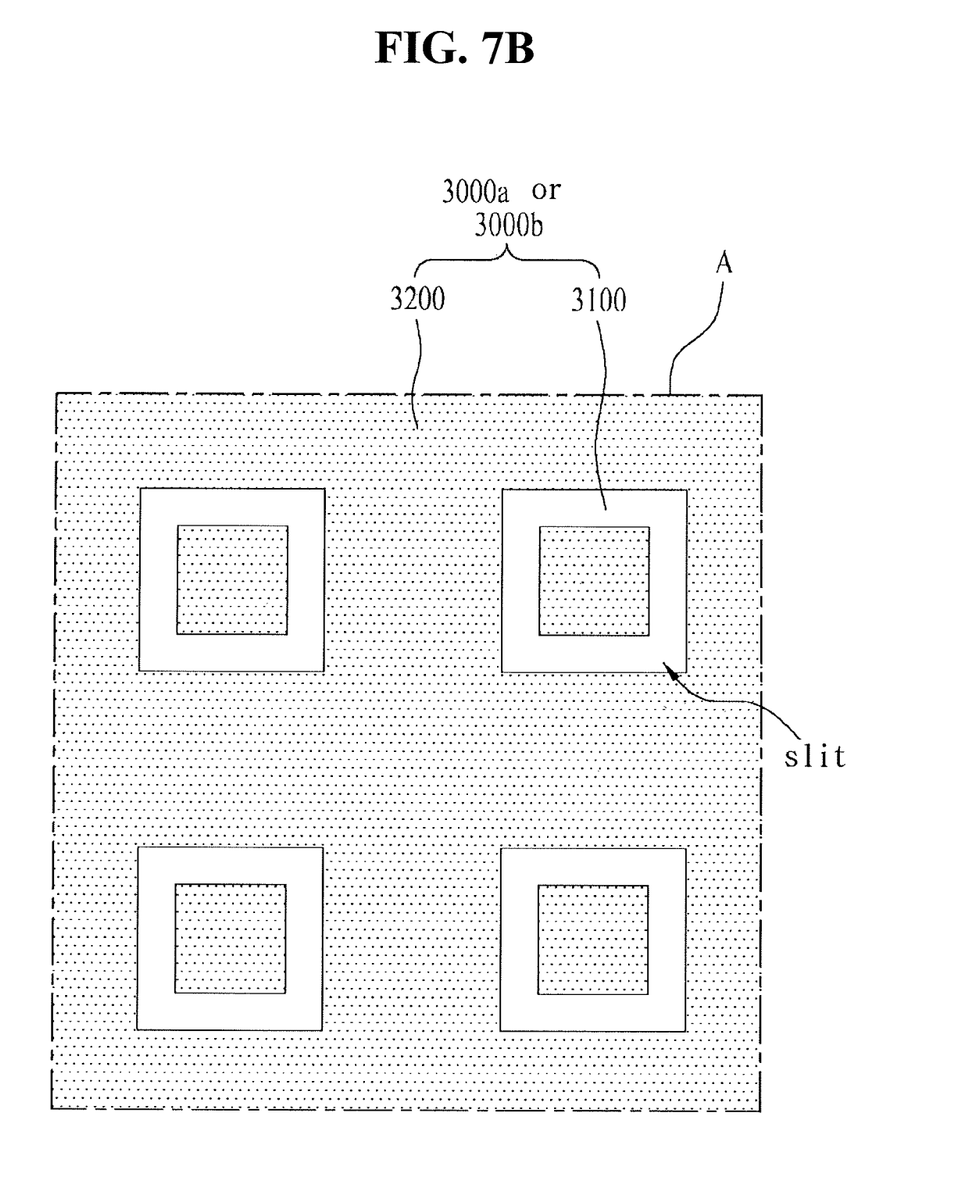

Referring to FIGS. 6 and 7B, a touch display device in accordance with another preferred embodiment of the present disclosure will be described in detail.

FIG. 6 illustrates a section of a touch display device in accordance with another preferred embodiment of the present disclosure, and FIGS. 7A and 7B illustrate a touch electrode of FIG. 6 and an enlarged view of the portion "A" of FIG. 7A, respectively.

Referring to FIG. 6, the touch display device includes a transparent conductive film formed on an outer surface of a second substrate 200 patterned to form a transparent conductive film 210 at a major area, but excluding two adjacent side areas, of the transparent conductive film for grounding of the transparent film. The touch display device touch further includes a plurality of first touch electrodes 3000a and a plurality of second touch electrodes 3000b at the side and at the lower side (corresponding to the excluded two adjacent side areas discussed above) formed by patterning to divide the same material.

That is, the touch display device has a configuration of the liquid crystal panel described in the foregoing embodiment at the lower side of the second substrate 200.

In addition, the transparent conductive film 210 and the plurality of first and second touch electrodes 3000a and 3000b are patterns formed by forming the same transparent electrode material on the backside of the second substrate 200 and performing a one-time patterning of the transparent electrode material thus formed. In this case, the transparent electrode material is deposited on the outer surface of the second substrate 200 by sputtering or the like, and is patterned to separate from one another by exposing and developing photoresist to form the transparent conductive film 210 and the plurality of first and second touch electrodes 3000a and 3000b.

Or, alternatively, a transparent conductive film may be printed on the outer surface of the second substrate 200 to form the transparent conductive film 210 and separate the first and second plurality of touch electrodes 3000a and 3000b from one another.

The first and second plurality of touch electrodes 3000a and 3000b are connected to one end of each of first and second FPC substrates 400a and 400b for controlling a signal through first and second routing lines 3010 and 3020, respectively.

Further, the first and second FPC substrates 400a and 400b include first and second connecting portions 410a and 410b at the other sides and connected to a single connector 415, and the connector 415 is connected to a system of the liquid crystal panel which supplies a timing signal and a picture signal to the PCB, for receiving a control signal therefrom.

In this instance, the first and second plurality of touch electrodes 3000a and 3000b are positioned at a display region, and the user, while watching a screen, may touch the touch electrode by allowing an input tool such as a finger to be adjacent to the touch electrode 3000a or 3000b.

In the meantime, referring to FIGS. 7A and 7B, the touch electrodes 3000a and 3000b include holes therein to form mesh patterns 3200, the mesh patterns having a hole therein and a dummy pattern 3100 formed in the hole.

The dummy pattern 3100 is in a floating state, and is a pattern which has no connection to the routing line. The dummy pattern is a layer provided additionally for preventing the pattern from becoming visible due to reflection.

The dummy pattern 3100 is formed of a transparent electrode material, and can be formed to have a width of 10~300 μm. To prevent the hole from becoming visible, it is preferable that a gap is 10~30 μm from a periphery of the mesh pattern 3200.

In FIG. 6, an outer area of dotted lines is blocked by a case (a case top or system cover). In this case, an inner area of dotted lines corresponds to an active area in which image is displayed and touch is sensed.

Description of elements not made herein, which is the same with the foregoing embodiment, will be omitted.

Thus, the touch display device of the present disclosure is in a configuration where the touch panel is placed on the liquid crystal panel. The liquid crystal display device with an embedded touch panel is preferably formed as an on-cell capacitive type. In this instance, the second substrate of the liquid crystal panel can be used as a substrate of the touch panel, thereby reducing a number of substrate to be used.

Both the mutual capacitive type and the self capacitive type are applicable to the touch panel.

A shape of the touch electrode is not limited to a rectangular shape shown in the attached drawings, but the touch electrode may have a polygonal shape including a diamond shape, an octagonal shape, and a hexagonal shape, or a circular shape.

The above embodiments are described with a liquid crystal display panel as the display panel of a touch display device. However, other types of display panels may also be used.

A method for manufacturing a touch display device will be described with reference to FIGS. 2, 3 and 4B.

A transparent electrode is deposited on an outer surface (one side) of a second substrate 200, and the transparent electrode is patterned to form a plurality of the touch electrodes 220 or 220a adjacent to an edge of the transparent electrode and a transparent conductive film 210 at a remaining region spaced from the plurality of the touch electrodes 220. In this instance, a step may be added for forming on the outer surface of the second substrate 200 a plurality of routing lines 225 connected to the plurality of the touch electrodes 220. It is preferable that the routing lines 225 are formed of metal.

Then, the second substrate 200 is inverted, and a filter array forming step is performed to form a black matrix layer 201 and a color filter layer 202 on the other side (inside) of the second substrate 200.

Then, a thin film transistor array forming step is performed on a first substrate 100. In the thin film transistor array forming step, gate lines and data lines which define pixel region as the gate lines and the data lines cross, a thin film transistor at every crossed portion of the gate lines and the data lines, and pixel electrodes (and common electrodes) at pixel regions, are formed.

Then, a liquid crystal layer 150 is formed between the first and second substrates 100 and 200. Either injection or dropping of the liquid crystals may be applicable in the formation of the liquid crystal layer 150.

Then, the first and second substrates 100 and 200 are bonded together to form a liquid crystal panel.

Then, a second polarizing plate 320 is formed on an outer surface of the second substrate 200 to cover the transparent conductive film 210 and the plurality of the touch electrodes 220 or 220a.

Then, a first polarizing plate 310 is formed on the outer surface of the first substrate 200. In this instance, a sequence of formation of the first and second polarizing plates 310 and 320 may be reversed, or the first and second polarizing plates 310 and 320 may be formed at the same time.

Then, an FPC substrate 250 connected to a plurality of routing lines 225 are formed with a transparent electrode material the same as the touch electrode 220 at an edge of the outer surface of the second substrate 200.

And, a step may be added for forming a case (not shown) which surrounds edges of the liquid crystal panel and the first and second polarizing plates 310 and 320.

In this case, the transparent conductive film 210 can be connected to the FPC substrate 250, Ag dot processed, or connected to the case with a conductive tape (not shown), to ground the transparent conductive film 210.

In the meantime, referring to FIG. 4B, it is preferable, in view of reducing initial capacitance, that each of the plurality of the touch electrodes 220a is formed to include mesh patterns each having a plurality of holes, and a dummy pattern in each of the holes.

In this instance, the transparent conductive film 210 is formed to have a whole shape which is a unitary pattern for making secure grounding.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A touch display device comprising:
    a display panel including first and second substrates and a liquid crystal layer between the first and second substrates;
    a conductive layer preventing static electricity disposed on an outer surface of the display panel;
    a touch electrode layer disposed on an outer surface of the display panel, wherein the touch electrode layer is disposed as a single co-planar layer with the conductive layer occupying a majority portion of the display panel, and the touch electrode layer being disposed between an edge of the display panel and the conductive layer, without any overlap between the touch electrode layer and the conductive layer;
    a routing line coupled to the touch electrode layer; and
    a polarizer disposed on both the touch electrode layer and the conductive layer, wherein the conductive layer and the touch electrode layer are formed of the same material and are electrically isolated from each other.

2. The device of claim 1, wherein the conductive layer and the touch electrode layer are transparent.

3. The device of claim 1, wherein:
    the conductive layer, the touch electrode layer and the routing line are formed of the same material, and
    the routing line is disposed on the display panel.

4. The device of claim 1, wherein the routing line is transparent.

5. The device of claim 1, wherein:
    the conductive layer and the touch electrode layer are electrically separated, and the conductive layer is grounded.

6. The device of claim 5, wherein the conductive layer is grounded via an enclosure of the device.

7. The device of claim 1, wherein the routing line is coupled to a touch controller.

8. The device of claim 1, wherein the touch electrode layer includes at least one hole to reduce an initial capacitance of the touch electrode layer.

9. The device of claim 8, wherein an at least one dummy pattern is disposed within each of the at least one hole.

10. The device of claim 9, wherein the conductive layer, the touch electrode layer, the routing line and the dummy pattern are formed of the same material.

11. The device of claim 9, wherein the dummy pattern is electrically isolated from the touch electrode layer.

12. The device of claim 9, wherein the dummy pattern is a floating pattern to which no voltage is applied.

13. The device of claim 9, wherein the dummy pattern has a width of about 10~300 μm.

14. The device of claim 9, wherein a gap between the dummy pattern and the touch electrode layer is about 10~30 μm.

* * * * *

UNITED STATES PATENT AND TRADEMARK OFFICE
CERTIFICATE OF CORRECTION

PATENT NO. : 9,575,583 B2  
APPLICATION NO. : 12/961153  
DATED : February 21, 2017  
INVENTOR(S) : Yoon-Hwan Woo et al.

Page 1 of 1

It is certified that error appears in the above-identified patent and that said Letters Patent is hereby corrected as shown below:

On the Title Page

Left column, item (75), replace "Min-Ho Na," with --Man-Ho Na,--.

Signed and Sealed this  
Twenty-fourth Day of April, 2018

Andrei Iancu  
*Director of the United States Patent and Trademark Office*